(12) United States Patent
Muschaweck

(10) Patent No.: US 8,493,315 B2
(45) Date of Patent: Jul. 23, 2013

(54) DISPLAY ASSEMBLY AND METHOD FOR DRIVING A DISPLAY UNIT OF A DISPLAY ASSEMBLY

(75) Inventor: Julius Muschaweck, Gauting (DE)

(73) Assignee: OSRAM Opto Semiconductors GmbH (DE)

( * ) Notice: Subject to any disclaimer, the term of this patent is extended or adjusted under 35 U.S.C. 154(b) by 237 days.

(21) Appl. No.: 12/676,001

(22) PCT Filed: Sep. 3, 2008

(86) PCT No.: PCT/DE2008/001485
§ 371 (c)(1),
(2), (4) Date: May 18, 2010

(87) PCT Pub. No.: WO2009/030222
PCT Pub. Date: Mar. 12, 2009

(65) Prior Publication Data
US 2010/0302290 A1 Dec. 2, 2010

(30) Foreign Application Priority Data
Sep. 5, 2007 (DE) .......................... 10 2007 042 104

(51) Int. Cl.
*G09G 3/36* (2006.01)
(52) U.S. Cl.
USPC .......................................... 345/102; 362/613
(58) Field of Classification Search
USPC ....................... 345/87–103; 362/31, 600–634
See application file for complete search history.

(56) References Cited

U.S. PATENT DOCUMENTS

| 6,115,092 A | 9/2000 | Greene et al. |
| 6,241,358 B1 * | 6/2001 | Higuchi et al. ............... 362/613 |
| 6,760,075 B2 * | 7/2004 | Mayer et al. .................. 348/383 |
| 6,801,178 B2 | 10/2004 | Nitta et al. |
| 7,488,104 B2 | 2/2009 | Hamada et al. |
| 8,092,062 B2 * | 1/2012 | Kubo et al. ................... 362/606 |
| 8,092,064 B2 * | 1/2012 | Erchak et al. ................. 362/613 |
| 2001/0017774 A1 * | 8/2001 | Ito et al. .......................... 362/31 |

(Continued)

FOREIGN PATENT DOCUMENTS

| DE | 20 2005 001 507 U1 | 3/2006 |
| DE | 11 2005 001 170 15 | 4/2007 |

(Continued)

OTHER PUBLICATIONS

Helge Seetzen et al., "A High Dynamic Range Display Using Low and High Resolution Modulators," Dept. of Physics and Astronomy, University of British Columbia, Vancouver, Canada, SID 03 Digest, pp. 1-4.

(Continued)

*Primary Examiner* — Dmitry Bolotin
(74) *Attorney, Agent, or Firm* — DLA Piper LLP (US)

(57) ABSTRACT

A display assembly comprising a backlight unit having at least two optical waveguide elements lying alongside one another, and configured such that light is emitted with a greater brightness in a boundary region of the optical waveguide elements than outside the boundary regions, a display unit arranged such that during operation of the display assembly light emitted by the backlight unit impinges on a rear side of the display unit, a diffuser layer arranged between the backlight unit and the display unit, and a control unit that compensates for a greater brightness in the boundary regions by adapted driving of the display unit.

11 Claims, 3 Drawing Sheets

U.S. PATENT DOCUMENTS

| | | | |
|---|---|---|---|
| 2001/0053072 A1* | 12/2001 | Takemoto | 362/31 |
| 2002/0024803 A1* | 2/2002 | Adachi et al. | 362/31 |
| 2004/0113906 A1 | 6/2004 | Lew et al. | |
| 2006/0022935 A1 | 2/2006 | Sakai et al. | |
| 2006/0187180 A1 | 8/2006 | Park et al. | |
| 2006/0187182 A1* | 8/2006 | Yu et al. | 345/102 |
| 2006/0221638 A1* | 10/2006 | Chew et al. | 362/613 |
| 2007/0052661 A1* | 3/2007 | Shikata | 345/102 |
| 2007/0247871 A1* | 10/2007 | Yoo | 362/612 |
| 2007/0262947 A1 | 11/2007 | Wang et al. | |
| 2008/0186272 A1 | 8/2008 | Huang et al. | |
| 2009/0059566 A1* | 3/2009 | Kofidis et al. | 362/97.2 |

FOREIGN PATENT DOCUMENTS

| | | |
|---|---|---|
| EP | 0 987 490 A1 | 3/2000 |
| EP | 1 890 280 A2 | 2/2008 |
| JP | 5-64103 | 3/1993 |
| JP | 2001-312916 | 11/2001 |
| JP | 2004-507954 | 3/2004 |
| JP | 2006-40764 | 2/2006 |
| JP | 2006-522436 | 9/2006 |
| JP | 2007-65572 | 3/2007 |
| TW | 480877 | 3/2002 |
| TW | 559770 | 11/2003 |
| TW | 200426408 | 12/2004 |
| TW | 200630919 | 9/2006 |
| WO | 02/19028 A1 | 3/2002 |
| WO | WO 2007093463 A1 * | 8/2007 |

OTHER PUBLICATIONS

T. Shirai et al, "RGB-LED Backlights for LDC-TVs with 0D, 1D, and 2D Adaptive Dimming," Dept. of Electronic Engineering, The University of Electro-Communications, Chofu, Tokyo 182-8585, Japan, SID 06 Digest, pp. 1520-1523.

Helge Seetzen et al., "Self-Calibrating Wide Color Gamut High Dynamic Range Display," IS&T/SPIE's Annual Symposium on Electronic Imaging, vol. 6492, Feb. 12, 2007, pp. 64920/1-9.

Pierre de Greef et al., "Adaptive Dimming and Boosting Backlight for LCD-TV Systems," NXP Semiconductors (founded by Philips) Innovation Center—Display Solutions, Eindhoven, the Netherlands, SID 07 Digest, pp. 1332-1335.

Huajun J. Peng et al., "High Contrast LDC TV Using Active Dynamic LED Backlight," Material & Packaging Program, Applied Science and Technology Research Institute (ASTRI), Hong Kong Science Park, HKSAR, P.R. China, SID 07 Digest, pp. 1336-1338.

* cited by examiner

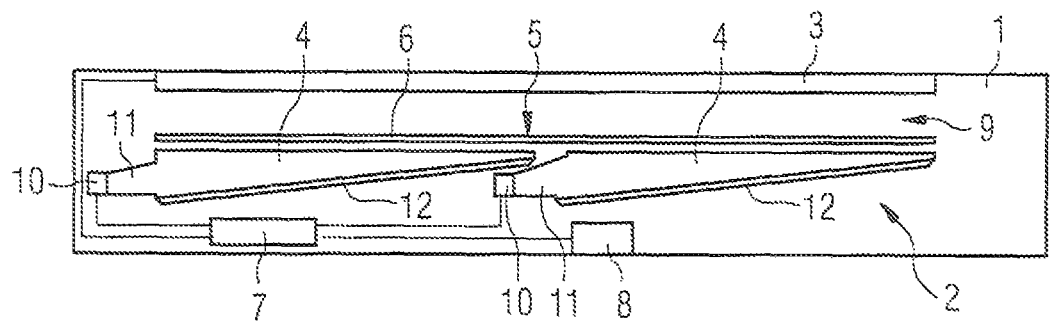
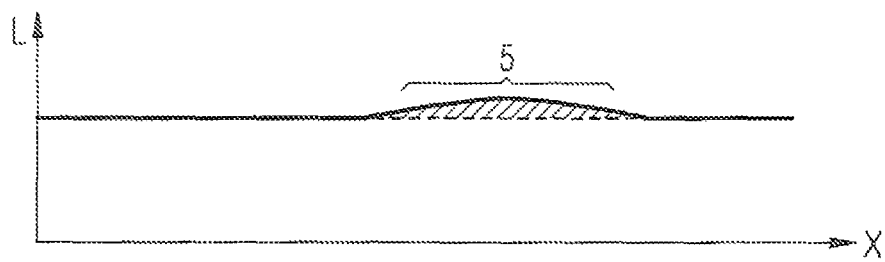
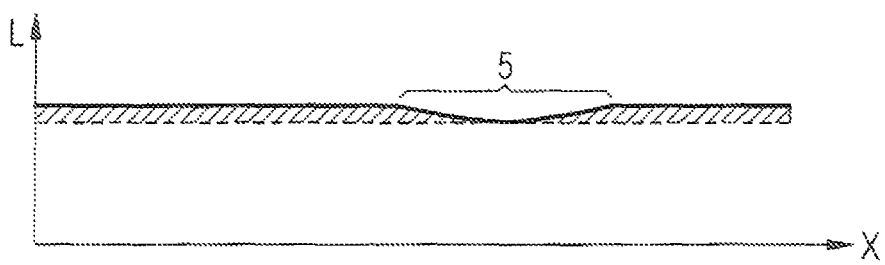

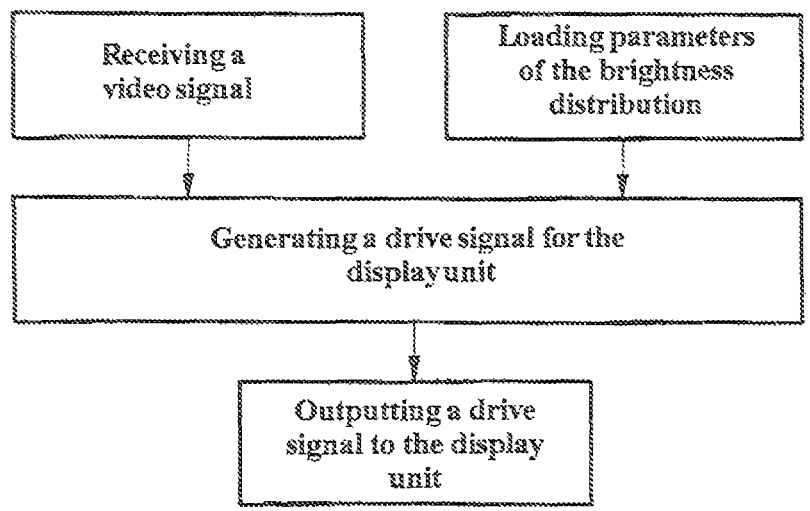
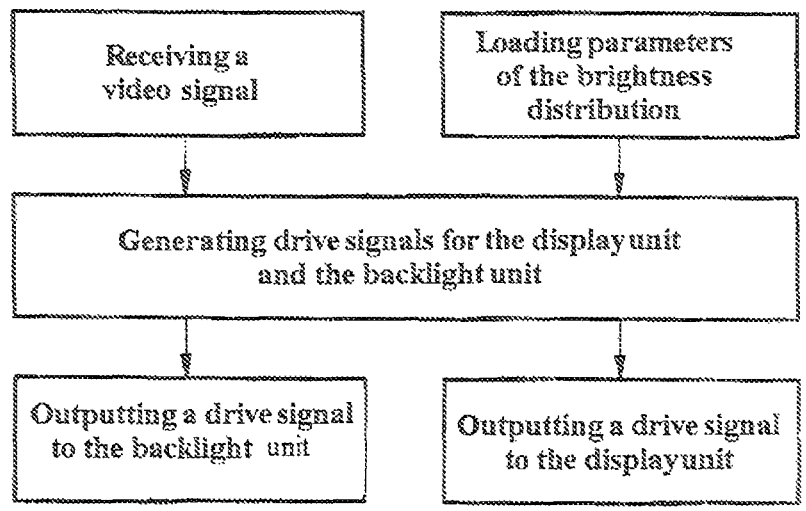

DISPLAY ASSEMBLY AND METHOD FOR DRIVING A DISPLAY UNIT OF A DISPLAY ASSEMBLY

RELATED APPLICATIONS

This is a §371 of International Application No. PCT/DE2008/001485, with an international filing date of Sep. 3, 2008 (WO 2009/030222 A1, published Mar. 12, 2009), which is based on German Patent Application No. 10 2007 042 104.6, filed Sep. 5, 2007, the subject matter of which is incorporated by reference.

TECHNICAL FIELD

This disclosure relates to a display assembly comprising a backlight unit and a display unit arranged such that during operation of the display assembly light emitted by the backlight unit impinges on the rear side of the display unit.

In addition, the disclosure relates to methods for driving a display unit of a display assembly and for providing parameters of a brightness distribution of a backlight unit.

BACKGROUND

Display assemblies of this type relate to conventional configurations of computer flat screens or LCD televisions. While the display unit is driven to determine for the individual pixels whether and how light of the different colors is emitted, the backlight unit provides for generating the light which is emitted by the display unit in the direction of an observer.

Although flat screens or LCD televisions have a very compact configuration by comparison with conventional monitors or televisions, it is nevertheless an endeavor in technical development to make display assemblies even flatter. This is particularly relevant in the case of flat screens for mobile applications in notebooks or laptops since the thickness of the entire device is concomitantly determined to a significant extent by the thickness of the display assembly.

To provide thin display assemblies, it is known for direct backlight of the display unit not to be implemented, but rather for the light-generating components to be arranged laterally and for the light to be allowed to emerge in the desired regions by means of optical waveguides. In the case of particularly large flat screens there is the problem, however, that such large optical waveguides cannot be provided for reasons of production engineering. Although long, narrow optical waveguides could be arranged alongside one another, this would not lead to a satisfactory result since, at the boundary regions between the individual optical waveguides, stripes would be discernible on the image.

It could therefore be helpful to provide a display assembly which is very flat and nevertheless enables an image to be rendered without any stripes. Moreover, it could be helpful to provide a correspondingly suitable method for driving a display unit.

SUMMARY

I provide a display assembly including a backlight unit having at least two optical waveguide elements lying alongside one another, and configured such that light is emitted with a greater brightness in a boundary region of the optical waveguide elements than outside the boundary regions, a display unit arranged such that during operation of the display assembly light emitted by the backlight unit impinges on a rear side of the display unit, a diffuser layer arranged between the backlight unit and the display unit, and a control unit that compensates for a greater brightness in the boundary regions by adapted driving of the display unit.

I also provide a method for driving a display unit of a display assembly having a backlight unit, including receiving a video signal, processing the video signal using a previously known brightness distribution of light emitted by the backlight unit, and driving the display unit in such a way that brightness differences of the backlight unit are compensated for.

I further provide a method for providing parameters of a brightness distribution for use in the display assembly, including driving a display unit to represent a homogeneous brightness without taking account of the brightness distribution of a backlight unit, measuring the brightness distribution of light emitted by the display unit, and storing parameters of the measured brightness distribution in the display assembly.

BRIEF DESCRIPTION OF THE DRAWINGS

My assemblies and methods are explained in greater detail below on the basis of representative examples. In the figures:

FIG. 1 shows a schematic cross-sectional illustration of an example of a display assembly;

FIG. 2A shows a diagram with an exemplary brightness distribution;

FIG. 2B shows a further diagram with an exemplary brightness distribution;

FIG. 3 shows a flowchart of a first method for generating a drive signal;

FIG. 4 shows a flowchart of a second method for generating a drive signal; and

DETAILED DESCRIPTION

Figure 5:
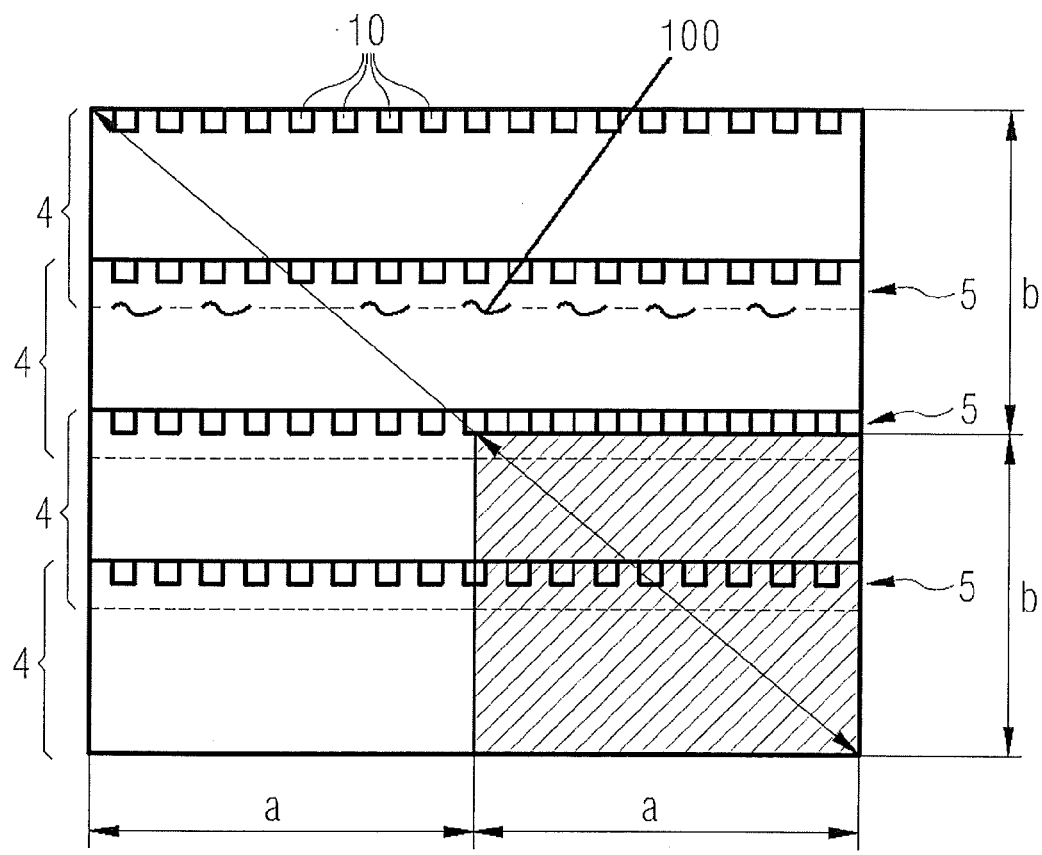
FIG. 5 shows a plan view of a display assembly.

I provide a display assembly which is characterized in that the backlight unit has at least two optical waveguide elements lying alongside one another, the backlight unit being configured in such a way that light is emitted with a greater brightness in the boundary region of the optical waveguide elements than outside the boundary regions, a diffuser layer is arranged between the backlight unit and the display unit, and a control unit is provided and designed to compensate for a greater brightness in the boundary regions by means of an adapted driving of the display unit.

I use, despite the potential arising of stripes, optical waveguide elements lying alongside one another to provide the backlight of the display unit. Then, two elements interact: firstly, light having a greater brightness is deliberately emitted in the boundary regions of two optical waveguide elements and, secondly, provision is made for blocking the light emitted "in excess" by means of corresponding driving of the display unit, which is also referred to hereinafter as "dimming." By virtue of the fact that only an excessively large brightness in relatively small regions has to be dimmed, an efficient manner of operation of a display assembly is possible. A diffuser layer between the backlight unit and the display unit makes it possible for the increased brightness in the boundary regions to appear in faded fashion on the rear side of the display unit and thus to be compensated for in a comparatively simple manner without the human eye perceiving formation of stripes on the display unit.

An air gap may be formed between the diffuser layer and the display unit, the air gap additionally contributing to "smoothing" the brightness excess in the boundary regions, that is to say providing for continuous transitions.

In one example of the display assembly, an increased brightness in the boundary regions is promoted by coupling-out structures being provided in the overlap region of optical waveguide elements lying alongside one another, the coupling-out structures promoting the coupling-out of light. In optical waveguides, light can emerge only under specific preconditions, namely if an angle condition dependent on the refractive indices of the optical waveguide material and of the surrounding material is met. Therefore, the quantity of emerging light can be influenced by a particular configuration of the boundary region between the optical waveguide and the surroundings.

Furthermore, it is advantageous to reduce the thickness of the optical waveguide elements proceeding from the light coupling-in locations, at which the LEDs are arranged. This provides for uniform coupling-out of light over the entire area of the individual optical waveguide elements.

In one example of a display assembly, the display assembly has a thickness of less than 15 mm, preferably less than 10 mm.

The use of the concept is particularly advantageous in particular in the case of display assemblies having a diagonal greater than 60 cm.

In one example of the display assembly, the control unit is designed to divide a brightness—determined by a video signal—of an image to be displayed by a predetermined brightness distribution of the backlight unit and thereby to generate a drive signal for the display unit.

Turning now to the drawings, FIG. 1 shows a display assembly 1 comprising a display unit 3 on the front side and also a backlight unit 2 arranged in the interior of the housing. In this example, the backlight unit 2 has two optical waveguide elements 4, which overlap in a boundary region 5. Details regarding the configuration of optical waveguide elements 4 are known, for example, from German utility model specification DE 202005001507 U1, to which reference is made in this respect, instead of repeating the corresponding details herein.

A diffuser foil 6 is provided on the front side of the optical waveguide elements, the front side facing the display unit 3. An air gap 9 is formed between the diffuser foil 6 and the display unit 3. The diffuser foil 6 has the effect in conjunction with the air gap 9 that, although an increased brightness of the light emitted by the backlight unit 2 is present in the boundary region 5, the light does not have sharp contours, rather a soft transition to the region of increased brightness occurs. To put it non-technically, the increase in brightness is "smoothed."

The optical waveguide elements 4 have a wedge-shaped configuration, a light coupling-in area 11 being formed at the thick side of the wedge, a light-emitting diode, LED for short, 10 being arranged in each case at the light coupling-in area. The light radiated in from the LED 10 is partly reflected at the interfaces of the optical waveguide elements 4 and partly coupled out upward in the direction of the display unit 3. In one example, an additional reflective area 12 is provided on the rear side of the optical waveguide elements to thus avoid light losses. Moreover, the reflective foil prevents light from an LED 10 from penetrating from the rear side into an overlying optical waveguide element 4. The brightness of emerging light would be excessively boosted to an unintentionally great extent in this region as a result.

The wedge-shaped shaping contributes to the fact that light having a substantially identical brightness is emitted over the entire area of the optical waveguide elements 4. The luminous flux decreases proceeding from the LED 10 continuously along the wedge since part of the light emerges upward. Relative to the cross section of an optical waveguide element 4, however, the luminous flux remains approximately identical in this example.

A further measure for controlling the quantity of light that emerges consists in coupling-out structures being provided in the overlap region 5 of optical waveguide elements lying alongside one another, the coupling-out structures promoting the coupling-out of light. In optical waveguides, light can emerge only under specific preconditions, namely if an angle condition dependent, inter alia, on the refractive indices of the optical waveguide material and of the surrounding material is met. Therefore, the quantity of emerging light can be influenced by a particular configuration of the boundary region between the optical waveguide and the surroundings. Suitable measures are, for example, coupling-out prisms, roughened portions or diffusers in the optical waveguide element or at the surface thereof. The measures with regard to the surface configuration of the optical waveguide element 4 have the effect that the angle at which a light beam impinges on the interface of the optical waveguide element, for the same direction of the light beam, differs depending on the location within the optical waveguide element. Diffusers have the effect that the direction of the light beam is influenced and the angle of impingement is thus no longer dependent solely on the geometry of the optical waveguide element. This increases the probability of a light beam impinging on the interface at such an angle which permits emergence.

In the example of the display assembly shown, increased brightness is produced in the boundary regions by virtue of the fact that the coupling-out structures are configured in such a way that they allow more light to be coupled out in the boundary regions 5.

In the boundary region 5, in which the two optical waveguide elements 4 illustrated by way of example overlap, the brightness of the emitted light of the backlight unit 2 is therefore greater, on account of the measures described, than in the regions in which the optical waveguide elements 4 do not overlap. A brightness distribution over the backlight unit 2 such as is illustrated in FIG. 2A occurs. An increase in brightness occurs in the boundary region between the two optical waveguide elements 4, while a uniform brightness prevails in the regions outside the boundary region.

The brightness distribution shown in FIG. 2A is governed by the construction and therefore predetermined in this example. The previously known or predetermined brightness distribution can be stored as a function or as a table of values in a control unit 7 which performs the driving of the display unit 3. If a video signal containing image information that is intended to be represented on the display unit 3 is then received via an interface 8, the video signal is conditioned into a drive signal, as illustrated in FIG. 3. During conditioning, the known brightness distribution of the backlight unit 2 is taken into account and the display unit 3 is controlled to be correspondingly darker in the boundary region 5 of the backlight unit 2. The increased brightness of the backlight unit 2 in the boundary region 5 is thereby compensated for. From a technical point of view, a multiplication of the drive signal for the display unit 3 by the brightness distribution of the backlight unit 2 produces that brightness which is intended to be represented on account of the video signal received at the interface 8. On account of this relationship, the adapted drive signal can be calculated from the video signal in a comparatively simple manner.

The control unit 7 can additionally be connected to the LEDs 10 to influence the brightness of the backlight unit 2. In this case, as illustrated in FIG. 4, the driving of the LEDs would have to be taken into account in the generation of the drive signal for the display unit (3) since the brightness distribution is dependent both on factors governed by the construction and on the driving of the LEDs.

From the point of view of energy efficiency, the configuration with an increase in the brightness in the boundary region 5 is particularly advantageous since only comparatively little light of the backlight unit 2 has to be blocked by the display unit 3. What is involved, referring to FIG. 2A, is that region of the diagram which is illustrated in hatched fashion, which region lies above the constant brightness level, i.e., the region in the boundary region 5. If the optical waveguide elements 4 were configured such that a darker region was situated in the boundary region 5, then significantly more light would have to be filtered out, namely the region lying above the dashed line in FIG. 2B. The increase in the brightness in the boundary region 5 therefore entails an improvement in the energy efficiency.

A diffuser foil 6 is preferably used as the diffuser layer since it can also be produced in large-area fashion, such that it covers a plurality of optical waveguide elements 4 and therefore also covers the edges of the optical waveguide elements 4 in the boundary region 5.

The use of light-emitting diodes to generate the light of the backlight unit 2 is particularly advantageous because light-emitting diodes are very small. The arrangement of the light-emitting diodes 11 in the overlap region of two optical waveguide elements 4 has proved to be advantageous since a uniform brightness distribution over the surface of an optical waveguide element 4 is thus possible. Particularly if the light-emitting diodes 10 have a defined directional characteristic, the beam path within the optical waveguide elements 4 can be calculated comparatively exactly and the optical waveguide element 4 can be configured accordingly.

The use of strip-type optical waveguide elements 4 enables, in the case of particularly large displays, a high maximum brightness of the backlighting since thermal problems are avoided. This will become clear on the basis of an example explained with reference to FIG. 5. Proceeding from a display having the dimensions a*b, a doubling of the display diagonals leads to the dimensions 2a*2b, that is to say to a quadrupled area. If the brightness of the backlighting is intended to remain the same, it is necessary to use quadruple the number of LEDs. In the case of an integral optical waveguide, however, light can be coupled in only at the sides. The peripheral area is only doubled, however, such that the density of the LEDs along the periphery additionally has to be doubled. Consequently, the evolution of heat relative to the periphery also doubles, which leads to considerable thermal problems.

When the strip-type optical waveguide elements described are used, a doubled length arises for each optical waveguide element 4, that is to say that twice as many LEDs can be used for the same distance between the LEDs. Since, at the same time, double the number of optical waveguide elements 4 are used, this results in a quadrupled number of LEDs without the thermal loading increasing. Thus, even very large displays can be realized without complex cooling measures being required.

In one example, not only white light is used for backlighting, rather so-called "RGB light-emitting diodes," which can generate light of different colors, or else a plurality of LEDs each of a different color are used. Depending on the image information to be represented, the backlighting can be effected in different colors, which leads to an increased color saturation and to an increased contrast of the image perceived. For this purpose, the control unit 7 is designed to modify control signal for the display unit 3 not only with regard to the brightness relative to the video signal, but also with regard to the color. At the same time, the backlight unit 2 is driven such that the correct color impression arises again for an observer.

In a further example, a plurality of optical waveguide elements 4 are arranged in a matrix such that a faded image of the image to be represented for an observer can thus be represented by the backlight unit 2. By way of example, twelve optical waveguide units 4 could be used, arranged in a 4×3 matrix. While the backlight unit 2 thus projects a coarse image onto the rear side of the display unit 3, the display unit 3 itself is responsible for a nuancing of the colors represented and enables a sharp, high-contrast image to be represented. An additional advantage is that the energy efficiency is improved further, that is to say that the energy consumption is reduced.

The display assembly makes it possible, in a particularly simple manner, to implement an additional measure for improving the perceived image sharpness in the case of moving images, which is referred to as "scanning backlight" or "blinking backlight." In the case of this technique, the normally continuously luminous display backlight is replaced by a sequentially clocked backlight. In this case, for pixel regions of the display, the backlight is switched off for the fraction of a frame duration. On account of the perception properties of the human eye, a moving image generated in this way is perceived as sharper. In the case of a backlight unit which is divided into strips, a separate row of LEDs being used per strip, a continuously progressing bright strip can be realized in a particularly simple manner. The frequency with which the strip progresses continuously is preferably coordinated with the image refresh frequency of the display.

Further examples of display assemblies are at the discretion of those skilled in the art and are encompassed by this disclosure.

The invention claimed is:

1. A display assembly comprising:
    a backlight unit having at least two optical waveguide elements lying alongside one another and configured such that light is emitted with a greater brightness in a boundary region of the optical waveguide elements than outside the boundary region;
    a display unit arranged such that during operation of the display assembly light emitted by the backlight unit impinges on a rear side of the display unit;
    diffuser layer arranged between the backlight unit and the display unit;
    a control unit that compensates for a greater brightness in the boundary region by adapted driving of the display unit; and
    coupling-out structures comprising coupling-out prisms, roughened portions or diffusers in the boundary region which promote coupling-out light and arranged within the optical waveguide element or at a surface thereof.

2. The display assembly as claimed in claim 1, further comprising an air gap between the diffuser layer and the display unit.

3. The display assembly as claimed in claim 1, wherein the diffuser layer is formed by a diffuser foil.

4. The display assembly as claimed in claim 1, wherein two optical waveguide elements lying alongside one another overlap in the boundary region.

5. The display assembly as claimed in claim 4, wherein light-emitting diodes are provided as light sources to couple light laterally into the optical waveguide elements.

6. The display assembly as claimed in claim 5, further comprising light-emitting diodes provided in a region where the optical waveguide elements overlap.

7. The display assembly as claimed in claim 6, wherein thickness of the optical waveguide elements decreases proceeding from light coupling-in locations, at which the light-emitting diodes are arranged.

8. The display assembly as claimed in claim 1, wherein a front side of the optical waveguide elements, a front side facing the display assembly, runs substantially parallel to a rear side of the display assembly and a rear side of the optical waveguide elements is inclined toward the respective light coupling-in area.

9. The display assembly as claimed in claim 1, wherein the thickness of the display assembly is less than 15 mm.

10. The display assembly as claimed in claim 1, wherein the display unit has a diagonal greater than 60 cm.

11. The display assembly as claimed in claim 1, wherein the control unit is designed to divide a brightness determined by a video signal of an image to be represented by a predetermined brightness distribution of the backlight unit and thereby generate a drive signal for the display unit.

* * * * *

UNITED STATES PATENT AND TRADEMARK OFFICE
CERTIFICATE OF CORRECTION

| | | |
|---|---|---|
| PATENT NO. | : 8,493,315 B2 | Page 1 of 1 |
| APPLICATION NO. | : 12/676001 | |
| DATED | : July 23, 2013 | |
| INVENTOR(S) | : Muschaweck | |

It is certified that error appears in the above-identified patent and that said Letters Patent is hereby corrected as shown below:

In the Claims

<u>In Column 6</u>

At claim 1, line 45, please insert -- a -- before "diffuser layer".

Signed and Sealed this
Fifteenth Day of October, 2013

Teresa Stanek Rea
*Deputy Director of the United States Patent and Trademark Office*